March 6, 1956 R. PLATH 2,737,223
AUTOMATIC PARTIAL DEFLATING APPARATUS FOR VEHICLE TIRES
Filed June 4, 1954
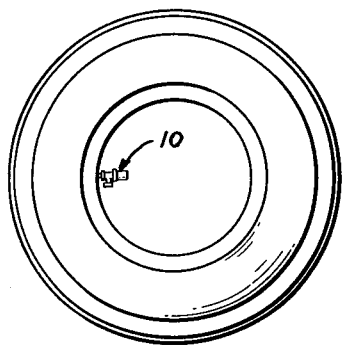
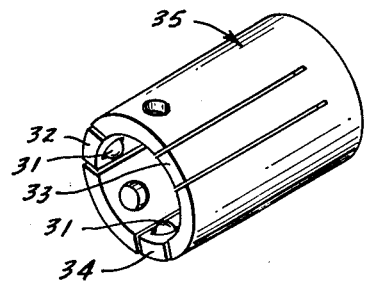
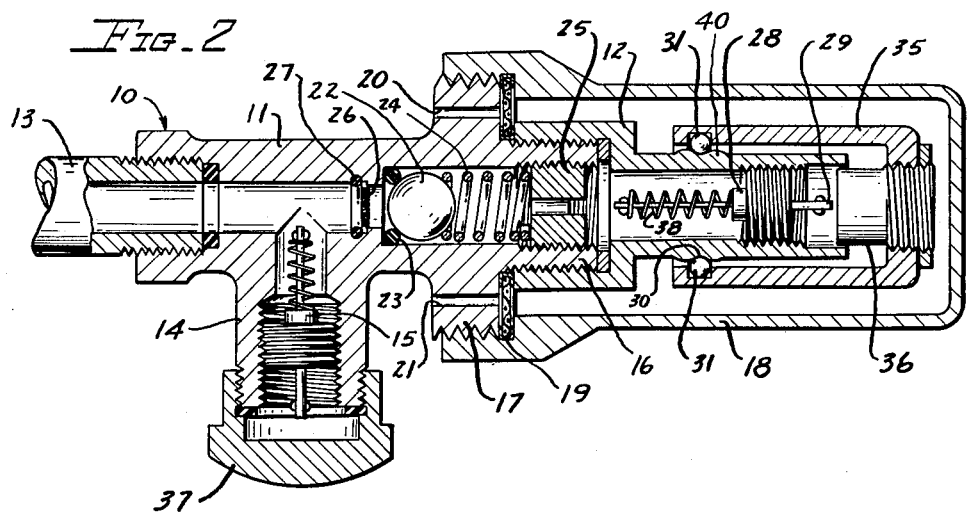
ROBERT PLATH
INVENTOR.
BY Hubert Miller
ATTORNEY

United States Patent Office

2,737,223
Patented Mar. 6, 1956

1

2,737,223

AUTOMATIC PARTIAL DEFLATING APPARATUS FOR VEHICLE TIRES

Robert Plath, Wichita, Kans., assignor to Boeing Airplane Company, Wichita, Kans., a corporation of Delaware Application June 4, 1954, Serial No. 434,621

8 Claims. (Cl. 152—415)

This invention relates generally to automatic tire deflating mechanisms, and more particularly to a unitary device adapted to be mounted on a wheel and connected to the tire valve stem for automatically partially deflating the tire to a predetermined pressure when wheel rotation reaches a predetermined speed, the device being actuated by centrifugal force.

The invention is particularly adaptable for use on aircraft tires. The invention is especially applicable to cargo carrying airplanes which take off under heavily loaded conditions, and land under less heavily loaded conditions due to reduction in fuel load, dropping of bombs, cargo, etc. There are a number of reasons why the tires of such airplanes should be highly inflated during the take off run, and be partially deflated during the landing run.

Protection of the tire carcass and overall prolongation of tire life are the primary objects in maintaining suitable pressure in the tires of a heavily loaded airplane during taxiing and take-off runs. Under-inflation, in relation to the load carried, results in excessive tread wear as well as in the much more damaging excessive deflection of the tire side walls. An additional but less important effect of under-inflation is the greater resistance to free wheel rotation due to the greater area of tire contact with the runway. This tends to increase the ground distance traveled by the plane before attaining flying speed.

Conversely, after the airplane has greatly reduced its gross weight during flight, there are certain disadvantages in landing the lightly loaded aircraft with highly inflated tires. For instance, the sidewalls of a highly inflated tire under low load conditions are deflected very little, if any. Consequently, the impact of the tires with the runway is transmitted through the highly inflated tire directly to the aircraft structure, subjecting the structure to excessive and unnecessary stresses. Jolts are also transmitted direct to the structure during the remainder of the landing run due to unevenness of the runway surface. In addition, the highly inflated underloaded tires have a very small contact area with the runway surface, resulting in very poor braking traction.

Reduction in tire pressure after take-off to provide proper inflation for landing an airplane which has materially reduced its gross weight during flight has two important advantages.

The air which is carried by the tires has weight. The partial release of tire air reduces the total load carried by the plane. It can be proven mathematically that if the pressure in all the tires of a large airplane is reduced from 200 p. s. i. to 90 p. s. i., the weight of the air released is approximately 60 pounds. The energy required to transport 60 pounds 5000 or more miles is considerable. Therefore, a weight reduction of 60 pounds is a very material advantage.

The second important advantage is that lower tire pressure permits the tires to absorb a considerable pro-

2 portion of the jolts and shocks which would otherwise be transmitted direct to the aircraft structure, this relieving the structure and prolonging its trouble free life.

It is a primary object of the invention to provide a unitary attachment for each wheel of an airplane which will allow the respective tires to be inflated to the proper pressure for heavily loaded take off, and which will automatically bleed air from the respective tires after the take off run, to provide a desired predetermined reduced tire pressure for the lightly loaded landing run of the airplane.

It is an additional object of the invention to provide a mechanism of the type described which may be easily and quickly adjusted without removal from the wheel to selectively determine the tire pressure at which air ceases to bleed from each tire.

It is an additional object to provide a mechanism of this type which permits the tire to be inflated to the desired pressure in the usual manner.

It is an additional general object of the invention to automatically provide increased tire contact area with the supporting surface, with consequent increase in traction, by automatically partially deflating the tire in response to wheel rotation of a predetermined speed.

The invention will be more clearly understood when the following description is read in connection with the accompanying drawings, in which:

Fig. 1 is a side view of a conventional tire showing the deflation unit of this invention attached to the tire stem;

Fig. 2 is a longitudinal sectional view through a deflation unit embodying the invention, the unit being shown attached to a tire stem;

Fig. 3 is a perspective view of a centrifugal valve actuator which constitutes a part of the invention.

Referring to Fig. 2 of the drawings, it will be seen that the invention includes a small unitary housing designated as a whole by the numeral 10. The housing includes a T 11, and a substantially tubular extension threaded on one end of the cross branch of the T, the extension being designated by the numeral 12. The other end of the cross branch of the T is adapted to be threaded onto and carried by the tire valve stem 13 in place of the conventional tire stem cap. The angle branch 14 of the T serves as an air filler opening, and is fitted with the usual tire valve 15 to afford inflation of the tire in the usual manner. A cap 37 is provided for this branch 14. The branch 16 of the T is provided with an enlarged exteriorly threaded shoulder 17 which receives and seats one end of a dust protector 18. This dust protector 18 seats on an annular dust filter 19 which prevents dust from entering the interior of the protector through the air escape holes 20 and 21, but allows air to pass out through those holes.

A tire deflation limiting means, also referred to herein as "partial deflating means," is housed in the branch 16. In the embodiment shown this means includes a ball check type pressure opened relief valve 22 seated on a resilient O-ring 23. A spring 24 backed by a threaded adjustable sleeve 25 urges the ball toward its seated position. This valve 22 serves as a means for partially deflating the tire, as well as a means for selectively limiting the degree of deflation. A dust filter 26, held on its seat in the T by a snap ring 27, protects the ball valve and its seat 23.

A standard spring and pressure closed tire valve 28 is threaded into the outer end of extension 12. The two valves 22 and 28 are thus arranged in series or in tandem in the conduit, i. e. air must first pass through valve 22 before it can pass through valve 28. Since valve 28 remains closed until forcibly opened against both spring and air pressure it serves as a preferred type of tire deflation control means. It normally overrides valve 22 and prevents escape of air from the tire through that valve. Valve 28 is provided with a reciprocable stem or plunger 29 by means of which the valve may be unseated, to thus allow passage of air from the tire through and under the sole control of valve 22.

The invention includes a centrifugally actuated means for unseating valve 28 to allow air to escape from the tire under control of the partial deflating means—valve 22. To this end extension 12 is provided with an annular external enlargement which is annularly grooved, as at 30, to seat a plurality of inwardly spring pressed balls 31 carried by the outer ends of spring fingers 32, 33 and 34 of a cup-like centrifugally actuated valve actuator 35. As clearly shown in Fig. 2, this actuator loosely slips over the outer end of extension 12, and is manually forced inward until its balls 31 seat in the groove 30, the balls and groove thus serving to normally hold the actuator in the position shown. Internally the actuator carries a longitudinally adjustable concentric projection 36 which is of a diameter to slidably enter the bore of extension 12. This projection cooperates with the extension to guide the relative longitudinal movement of the actuator, and also serves to contact valve plunger 29 and unseat valve 28 when the actuator moves inward with relation to extension 12.

*Pre-setting and operation*

Assume that one of the units is being used on each tire of a large airplane, and that the gross weight at take-off will be 200,000 lbs. and at landing 90,000 lbs. By calculation it may be determined that each tire at take-off should carry a pressure of 200 lbs. and at landing 90 lbs.

The units are threaded securely on the tire stems. The dust protector 18 of each unit is removed. Next, the extension 12 and its attached valve actuator 35 is removed as an assembly from each unit. Pressure is introduced into the tire through branch 14 of the T in the usual manner until the pressure gauge reads 90 lbs. Threaded sleeve 25 is then backed away from ball 22 until there is only a very slight leakage through this valve at 90 lbs. Valve 28, actuator 35, and dust protector 18 are next replaced in their Fig. 2 positions. Additional air is introduced through branch 14 until the tire pressure reaches 200 lbs. Valve 28 prevents air from escaping through valve 22.

As the airplane approaches its flying speed during its take-off run, the rotational speed of the tires creates sufficient centrifugal force to cause actuator 35 to move toward the periphery of the tire. Spring fingers 32 to 34 are forced outward slightly and balls 31 move over the inner edge 40 of groove 30, freeing the entire actuator to move outward. Projection 36 contacts and moves plunger 29 inward unseating valve 28. Air immediately begins to escape through valves 22 and 28 and holes 20 and 21 to atmosphere. When tire pressure has dropped to approximately 90 lbs. ball valve 22 is reseated by spring 24 and deflation ceases. The airplane thus lands with the predetermined reduced pressure in its tires.

It will be understood that after balls 31 are unseated from groove 30, the inward tension of fingers 32 to 34 is more than ample to prevent the actuator from returning to its Fig. 2 position.

It will also be understood by those familiar with this art that the thickness and arcuate width of spring fingers 32 to 34 may be varied to vary the inward spring tension applied to balls 31. Also that the total weight of actuator 35 may be varied. All such variations, coupled with the wheel diameter and its rotational speed at take-off for a particular airplane, will properly determine the precise time at which the actuator moves to unseat valve 28. The proper balance of the variable factors involved may be determined by test.

Having described the intention with sufficient clarity to enable those familiar with this art to construct and use it, I claim:

1. In a vehicle having a wheel mounted pneumatic tire, the combination with the tire stem of a relief valve for bleeding air from the tire to a predetermined pressure, a normally closed cut-off valve arranged in tandem with and outside said relief valve and normally preventing the escape of air from the tire through said relief valve, and centrifugally actuated means rotatable with the wheel for positively opening the cut-off valve when wheel rotation reaches a predetermined speed, thus allowing escape of air through the relief valve until tire air pressure reaches a predetermined value.

2. In a vehicle, the combination with a wheel mounted pneumatic tire having a single filler stem, of: a stem carried relief valve for bleeding air from the tire until tire pressure drops to a predetermined value; a relief valve over-riding air escape control valve carried by the stem in tandem with the relief valve; and centrifugally actuated means rotatable with the wheel for opening and holding said air escape control valve open when wheel rotation reaches a predetermined speed, thus allowing air to escape from the tire under the sole control of said relief valve.

3. In a vehicle, the combination with a wheel mounted pneumatic tire having a single filler stem, of: a stem carried relief valve for bleeding air from the tire until tire pressure drops to a predetermined value; a relief valve over-riding air escape control valve carried by the stem in tandem with the relief valve and serving to normally prevent escape of air through the relief valve; a radially disposed longitudinally reciprocable plunger for opening said control valve; and a centrifugally moved plunger actuator connected to the plunger and carried by the stem for moving the plunger in a valve opening direction when wheel rotation reaches a predetermined speed.

4. The apparatus described in claim 2, and adjustable means for selecting the pressure at which air ceases to bleed from said relief valve.

5. In a wheel mounted pneumatic tire having an inwardly projecting generally radially disposed filler stem, the combination with said stem of an elongated valve housing having one end secured to and in communication with said stem, the housing also being disposed generally radially with relation to the tire; a pressure closed valve mounted within the housing and normally maintained closed by tire pressure; a pressure opened valve within the housing between the stem and the pressure closed valve; and means carried by the housing and movable substantially radially of the tire under the influence of centrifugal force to open and hold open the pressure closed valve to afford escape of air from the tire through the pressure opened valve.

6. An attachment for the stem of a wheel mounted pneumatic tire for partially deflating the tire after wheel rotation reaches a predetermined rate comprising: a housing defining an air duct which communicates with the stem, said housing being attached to and supported by the stem; a relief valve in said duct for bleeding air from the tire to a predetermined pressure; a normally closed valve in said duct outside the relief valve to normally prevent escape of air from the stem through the relief valve and duct; and centrifugally actuated means carried by the housing and movable to open said normally closed valve when tire rotation reaches a predetermined rate whereby the relief valve assumes complete control of the passage of air from said stem.

7. In a wheel mounted pneumatic tire having an inwardly projecting generally radially disposed filler stem, the combination with said stem of an elongated valve housing having one end secured to and in communication with said stem, the housing also being disposed generally radially with relation to the tire; tire deflation control means mounted within the housing to normally prevent escape of air through the stem; and centrifugally moved means carried by the housing and movable longitudinally with relation thereto to actuate the deflation control means to afford escape of air from the tire past the deflation control means; and means in the housing between the stem and said deflation control means for limiting tire deflation to a pre-determined pressure.

8. In a wheel mounted pneumatic tire having an inwardly projecting generally radially disposed filler stem, the combination with said stem of an elongated valve housing having one end secured to and in communication with said stem, the housing also being disposed generally radially with relation to the tire; tire deflation control means mounted within the housing to normally prevent escape of air through the stem; and centrifugally moved means carried by the housing and movable longitudinally with relation thereto to actuate the deflation control means to afford escape of air from the tire past the deflation control means; and means in the housing between the stem and said deflation control means for limiting tire deflation to a predetermined pressure; and means for adjusting the tire deflation limiting means to selectively determine said pressure.

References Cited in the file of this patent

UNITED STATES PATENTS 2,470,873    Seitz ------------------ May 24, 1949